US006178184B1

(12) United States Patent
Petty

(10) Patent No.: US 6,178,184 B1
(45) Date of Patent: Jan. 23, 2001

(54) ARRANGEMENT FOR SYNCHRONIZATION OF MULTIPLE STREAMS OF SYNCHRONOUS TRAFFIC DELIVERED BY AN ASYNCHRONOUS MEDIUM

(75) Inventor: Norman W. Petty, Boulder, CO (US)

(73) Assignee: Avaya Technology Corp., Miami Lakes, FL (US)

( * ) Notice: Under 35 U.S.C. 154(b), the term of this patent shall be extended for 0 days.

(21) Appl. No.: 09/209,712

(22) Filed: Dec. 11, 1998

(51) Int. Cl.$^7$ ........................................... H04J 3/06
(52) U.S. Cl. .................................. 370/503; 370/474
(58) Field of Search ........................ 370/503, 280, 370/294, 300, 321, 324, 514, 236, 327, 329, 336, 341, 345, 350, 356, 359, 376, 395, 396, 412, 413, 415, 419, 437, 442, 458, 465, 470, 474, 476, 498, 508, 509, 510

(56) References Cited

U.S. PATENT DOCUMENTS

| | | | |
|---|---|---|---|
| 5,206,858 | * 4/1993 | Nakano et al. | 370/465 |
| 5,541,926 | * 7/1996 | Saito et al. | 370/474 |
| 5,570,355 | * 10/1996 | Dail et al. | 370/352 |
| 5,615,211 | * 3/1997 | Santore et al. | 370/419 |

(List continued on next page.)

FOREIGN PATENT DOCUMENTS

| | | | |
|---|---|---|---|
| 19518205 | 9/1996 | (DE) | H04L/5/22 |
| 0660555 | 6/1995 | (EP) | H04J/3/06 |

OTHER PUBLICATIONS

Hitoshi Uematsu Et Al: "Cell Delay Variation Smoothing Methods For ATM–Based SDH Signal Transport System" Electronics & Communications in Japan, Part 1—Communications, US, Sripta Technica, New York, vol. 76, No. 12, Dec. 1, 1993, pp. 14–27.

Hiroshi Uematsu Et Al: Implementation And Experimental Results Of Clad Using SRTS Method In ATM Networks: Proceedings Of The Global Telecommunications Conference (GLOBECOM), US, New York, IEEE, 1994, pp. 1815–1821.

"An Arrangement for Synchronization of a Stream of Synchronous Traffic Delivered by an Asynchronous Medium", N.W. Petty 30, mailed Sep. 15, 1998.

* cited by examiner

Primary Examiner—Douglas W. Olms
Assistant Examiner—Phirin Sam
(74) Attorney, Agent, or Firm—David Volejnicek

(57) ABSTRACT

An ATM cell constructor (100) of an ATM transmitter assembles a stream of frames of constant bit-rate traffic received on a listen TDM bus (102) into cell payloads (1104) using ATM adaptation layer 1 (AAL1). Once every eight cells, the AAL1 structured data transfer (SDT) cell constructor layer (112) introduces a one-octet SDT offset pointer (1120) into the payload. This pointer designates traffic-block (TDM frame) boundaries. The payload with an attached ATM header forms an ATM cell, and the constructor transmits a stream of the ATM cells to an ATM cell deconstructor (2100) of an ATM receiver. The deconstructor disassembles the payloads of the received ATM cells and transmits the stream of frames of constant bit-rate traffic on a talk TDM bus (102). In response to each received SDT offset pointer, the deconstructor's time slot interchanger (TSI 2108) resets to the start of frame-processing, thereby aligning frames formed by the TSI with the received frames. The deconstructor (2100:2104) detects occurrence of TDM frames on the talk TDM bus and synchronizes (aligns) transmission of the frames formed by the TSI with the TDM frames on the talk TDM bus. The listen and talk TDM buses are thereby synchronized with each other.

21 Claims, 15 Drawing Sheets

U.S. PATENT DOCUMENTS

| | | | |
|---|---|---|---|
| 5,706,285 | * 1/1998 | Saijonmaa et al. | 370/395 |
| 5,742,600 | * 4/1998 | Nishihara | 370/395 |
| 5,844,901 | * 12/1998 | Holden et al. | 370/399 |
| 5,848,067 | * 12/1998 | Osawa et al. | 370/394 |
| 5,886,989 | * 3/1999 | Evans et al. | 370/347 |
| 5,936,965 | * 8/1999 | Doshi et al. | 370/469 |
| 5,970,068 | * 10/1999 | Gray et al. | 370/395 |
| 5,978,355 | * 11/1999 | Yamaguchi | 370/230 |
| 5,999,529 | * 12/1999 | Bernstein et al. | 370/376 |
| 5,999,533 | * 12/1999 | Peres et al. | 370/395 |

ARRANGEMENT FOR SYNCHRONIZATION OF MULTIPLE STREAMS OF SYNCHRONOUS TRAFFIC DELIVERED BY AN ASYNCHRONOUS MEDIUM

TECHNICAL FIELD

This invention relates generally to packet-switching systems, such as asynchronous transfer mode (ATM) systems, and specifically to transmission-delay variations in such systems.

BACKGROUND OF THE INVENTION

Today's business communications environment consists of two separate network infrastructures: a voice network (such as a private branch exchange (PBX)) characterized by real-time, high-reliability, constant bit-rate (CBR) connections; and a data network (such as a packet network) characterized by high-bandwidth variable bit-rate (VBR) connections. Business needs for simplified maintenance, management, and access to information on diverse networks are forcing the convergence of these networks along with a new class of real-time multimedia networks. Asynchronous transfer mode (ATM) provides a single infrastructure that cost-effectively and flexibly handles both switching and transmission for the traffic types mentioned above (voice, video, and data) for both local-area networks and wide-area networks. The evolving network convergence requires the adaptation of the legacy PBX voice traffic to ATM. Voice telephony over ATM (VTOA) specifications allow adaptation of compressed or uncompressed voice pulse-code modulated (PCM) data streams into streams (virtual circuits) of CBR cells.

An ATM cell, regardless of the traffic it carries, is a packet 53 octets long: 48 octets of payload attached to a 5-octet header. The header contains addressing and management information used to direct the cell from source to destination and to ensure that the negotiated aspects of the traffic-flow through the ATM network are met. CBR traffic is assembled into cell payloads using ATM Adaptation Layer 1 (AAL1). The AAL1 cell constructor layer uses the first octet of the payload for its header and the remaining 47 octets to carry CBR information. Once every eight cells, the AAL1 structured data transfer (SDT) cell constructor layer introduces a one-octet pointer into the CBR payload. This pointer designates traffic-block boundaries. It is used at the receiving end to generate framing signals for devices that convert the ATM traffic into T1 or E1 (telephony trunk) traffic. ATM cell construction is then completed by attaching the ATM header to the payload.

Known existing devices that convert the ATM traffic into T1 or E1 traffic do not synchronize (align) the received blocks of traffic with the appropriate bits on a T1, E1, or TDM bus that is synchronized to another source (e.g., the destination synchronization source).

SUMMARY OF THE INVENTION

This invention is directed to solving these and other problems and disadvantages of the prior art. According to the invention, the received blocks of traffic are synchronized with the destination synchronization source. The synchronization is advantageously effected using the SDT block-boundary pointer. Generally according to one aspect of the invention, synchronous information received by a receiver over an asynchronous communications link is synchronized with a synchronous communications medium at the receiver as follows. The receiver asynchronously receives a stream of information, including the synchronous information, and an indication (e.g., the SDT block-boundary pointer) of where in the stream of information occurred a boundary between blocks (e.g., time-division multiplex (TDM) frames) of the stream of information, and transmits the received stream on the medium (e.g., a TDM bus). The receiver also detects where boundaries between blocks (e.g., between TDM frames) for information occur on the medium, and uses the indication (the pointer) to synchronize transmissions from the receiver on the medium of information at the boundary in the stream of information with occurrence of a boundary between blocks on the medium. Illustratively, both the indication and the boundaries between blocks for information on the medium represent boundaries between TDM frames of received traffic, so that the receiver aligns TDM frames of received traffic with TDM frames on the medium. If the receiver includes a time-slot interchanger (TSI) for reordering the time slots of TDM frames of received traffic, the TSI is reset by each indication, so that TDM frames generated by the TSI for transmission on the medium align with the TDM frames of received traffic.

According to another aspect of the invention, a first synchronous communications medium (e.g., a TDM bus) at a receiver of an asynchronous communications link (e.g., an ATM link) is synchronized with a second synchronous communications medium (e.g., a TDM bus) at a transmitter of the asynchronous communications link as follows. The transmitter detects a boundary (e.g., a framing signal) between blocks (e.g., TDM frames) of information in a stream of information that it is receiving from the second medium, and transmits the information asynchronously from the transmitter to the receiver with a first indication (e.g., an SDT pointer) of where in the stream of information the boundary occurred. The information and the first indication are received by the receiver, which transmits the information on the first medium. The receiver also detects where boundaries (e.g., framing signals) between blocks (e.g., TDM frames) for information occur on the first medium, and in response to receipt of the first indication the receiver synchronizes transmission on the first medium of the information at the boundary indicated by the first indication with occurrence of a boundary between blocks on the first medium. Again, if the receiver includes a TSI, the TSI is preferably reset to the beginning of frame generation by each received first indication.

The invention includes both a method of as well as a corresponding apparatus and a computer readable medium that contains software which, when executed in a computer, causes the computer to perform the method. The apparatus preferably includes an effector—any entity that effects the corresponding step, unlike a means—for each method step.

These and other features and advantages of the present invention will become more apparent from the following description of an illustrative embodiment of the invention considered together with the drawing.

DETAILED DESCRIPTION

Figure 1:
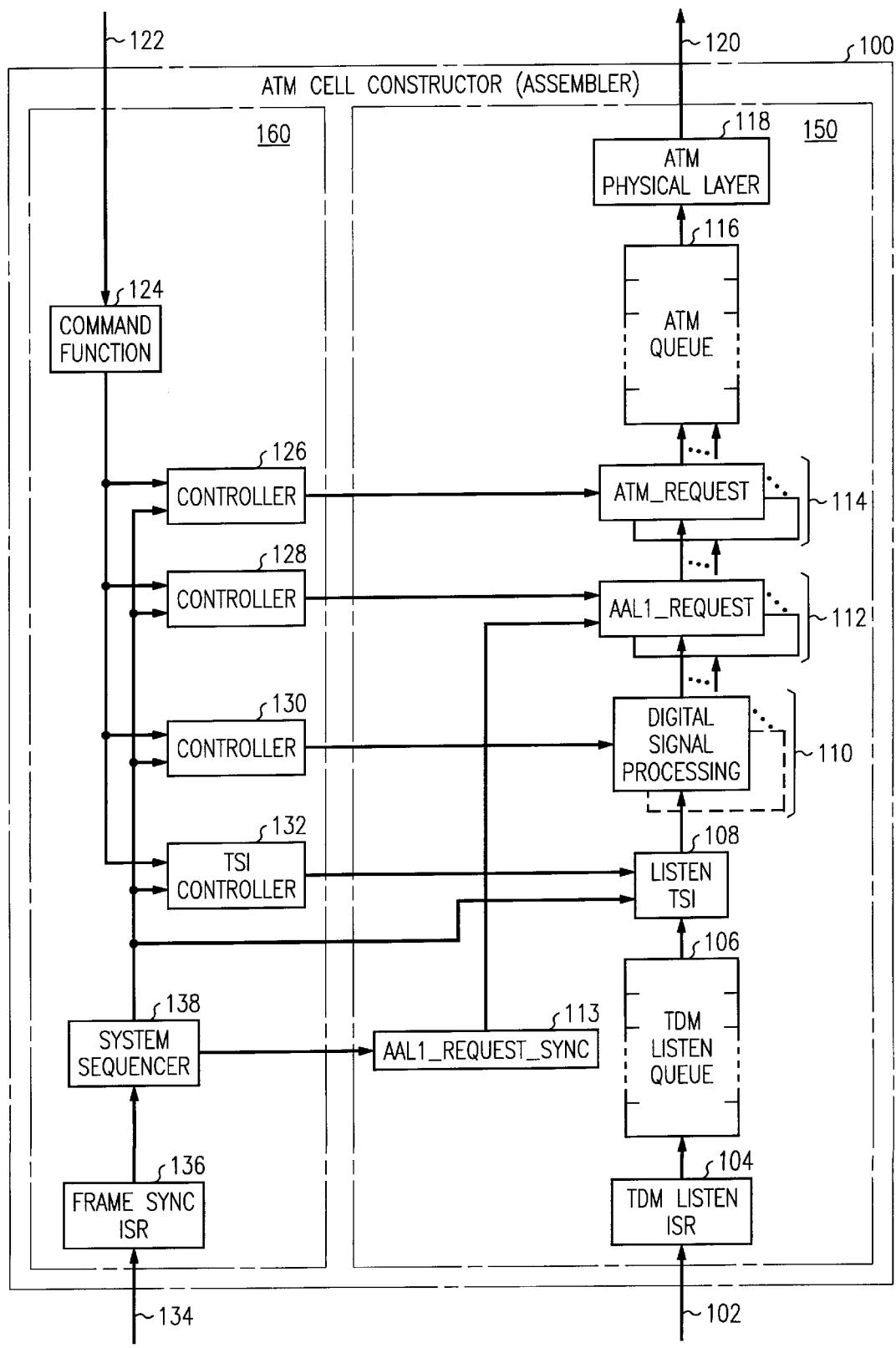
FIG. 1 is a block diagram of an ATM cell constructor that includes an illustrative embodiment of the invention.

FIG. 1 shows an ATM cell constructor 100, also known as an ATM cell assembler, such as may be used in an interface port circuit of a PBX or in any other ATM interface apparatus to construct ATM cells from CBR traffic, such as voice and/or video traffic. Cell constructor 100 and each of its components may be individually implemented either in hardware or in software/firmware. In the latter case, the software or firmware may be stored in any desired memory device readable by a computer—for example, a read-only memory (ROM) device readable by an interface port circuit processor. Multiple streams (also referred to herein as channels, calls, or communications) of CBR traffic are received by ATM cell constructor 100 over a communications medium 102, and follow a data path 150 through ATM cell constructor 100 where successive segments of the traffic streams are formed into packets (ATM cells). If the switching system employing ATM cell constructor 100 is the Definity® PBX of Lucent Technologies Inc., medium 102 is a time-division multiplexed (TDM) bus that carries up to 242 individual streams of traffic in 242 individual time slots of repeating frames. Each frame carries one (narrowband) or more (wideband) time slots of each channel's traffic stream. Each time slot carries one byte (octet) of traffic.

A TDM listen interrupt service routine (ISR) 104 captures traffic from designated time listen slots of medium 102 and feeds them serially into a TDM listen queue 106. A listen time-slot interchanger (TSI) 108 retrieves time slots of traffic from TDM listen queue 106 and performs any necessary time-slot interchange function thereon. Listen TSI 108 provides support for wideband channels that comprise multiple time slots; it ensures that those time slots are processed in their proper order. Listen TSI 108 then feeds the reordered time slots of traffic into one or more digital signal processors (DSPs) 110. A single DSP 110 may be time-shared by the plurality of channels, or a separate DSP 110 may be dedicated to serving each channel. DSPs 110 perform designated processing for the traffic of each channel, e.g., conferencing, echo cancellation, gain adjustment, compression, etc. The processed traffic of each channel is output by DSPs 110 into a separate instance of AAL1 request processor 112, each dedicated to serving a different channel. Each instance of AAL1-request processor 112 constructs ATM cell payloads from the corresponding channel's received traffic. Whenever it completes construction of a single cell's payload, an instance of AAL1 request processor 112 sends that payload to a corresponding instance of ATM-request processor 114. There is one instance of ATM-request processor 114 per channel. An instance of ATM-request processor 114 attaches an ATM cell header to the payload to complete the construction of an ATM cell and feeds the ATM cell into an ATM queue 116. ATM queue 116 is fed by all instances of ATM-request processor 114. An ATM physical layer processor 118 sequentially retrieves cells from ATM queue 116 and transmits them on an ATM communications medium 120 toward their destinations.

It takes on the order of a TDM bus frame-interval to process an individual time slot of traffic through data path 150; of course, up to a frame's worth of time slots may be processed in parallel. A TDM bus frame-interval is therefore taken as a cell construction period. It is a predetermined time interval during which each instance of ATM-request processor 114 can mature an ATM cell for transmission. It can take up to 47 frames to construct a cell, however.

A control structure 160 controls the operation of the components of data path 150. Cell constructor 100 receives control information over a control medium 122. If the switching system employing cell constructor 100 is the above mentioned Definity PBX, control medium 122 is illustratively either a control channel defined by the first 5 time slots of frames of the TDM bus of the PBX or a packet bus of the PBX. The control information is received in cell constructor 100 by a command function 124. This is a management function which tells controllers 126–132 of individual components of data path 150 what their component should be doing and when. For example, it tells TSI controller 132 when listen TSI 108 should begin to support a new time slot and which instance of AAL1-request 112 that time slot should be associated with, it tells controller 126 what VCINPI an instance of ATM-request 114 should use for a particular channel, it tells controller 128 when to initialize an instance of AAL1-request 112 for a new channel, and it tells DSP 110 what processing to perform for which channel. Controllers 126–132 then exert the corresponding necessary control over their associated components in data path 150.

To keep cell constructor 100 properly synchronized with the operation of communications medium 102 in the instance where medium 102 is a TDM bus, a start-of-frame signal is supplied to cell constructor 100 via a signal line 134. Line 134 is monitored by a frame sync interrupt service routine (ISR) 136, which issues an interrupt each time that it detects the start-of-frame signal. The interrupt is received by a system sequencer 138, which is a state machine that causes the components of data path 150 to step through their functions during each frame period.

Figure 9:
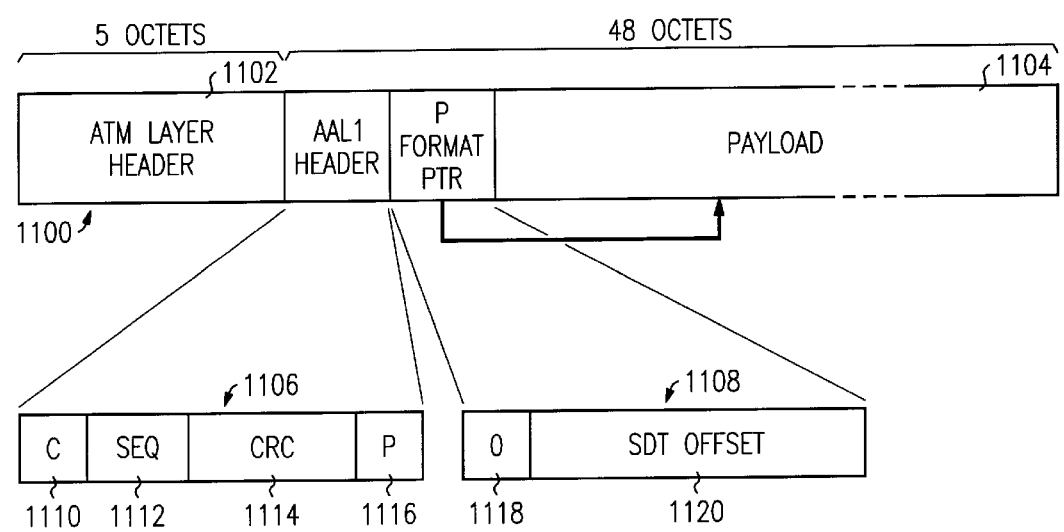
FIG. 9 is a block diagram of an ATM cell.

The structure of an ATM cell 1100 assembled by ATM cell constructor 100 is shown in FIG. 9. It comprises a conventional 5-octet ATM layer header 1102 and a conventional 48-octet payload 1104. The first octet of payload 1104 in every ATM cell 1100 is an AAL1 layer header 1106, and the second octet of payload 1104 in every eighth ATM cell 11 00 is a P-format pointer 1108, also as is conventional. AAL1 header 1106 conventionally comprises a one-bit convergence sublayer indication C 1110, a three-bit call sequence number SEQ 1112, a three-bit cyclic redundancy code over the sequence number CRC 1114, and a one-bit parity indication P 1116. C 1110 is used to provide clock synchronization between the transmitting and receiving equipment. It is set to a "one" on even sequence-count values to indicate P-format payload. SEQ 112 is used by the receiving equipment to detect lost or misinserted cells. P 1116 maintains even parity over AAL1 header 1106. P-format pointer 1108 comprises a seven-bit SDT (structured data transfer) offset 1120 and a one-bit even-parity indication O 1108. SDT offset is a pointer into payload 1104 that identifies boundary between blocks (the start of a block) of data in payload 1104. O 1118 maintains even parity over SDT offset 1120.

Figure 2:
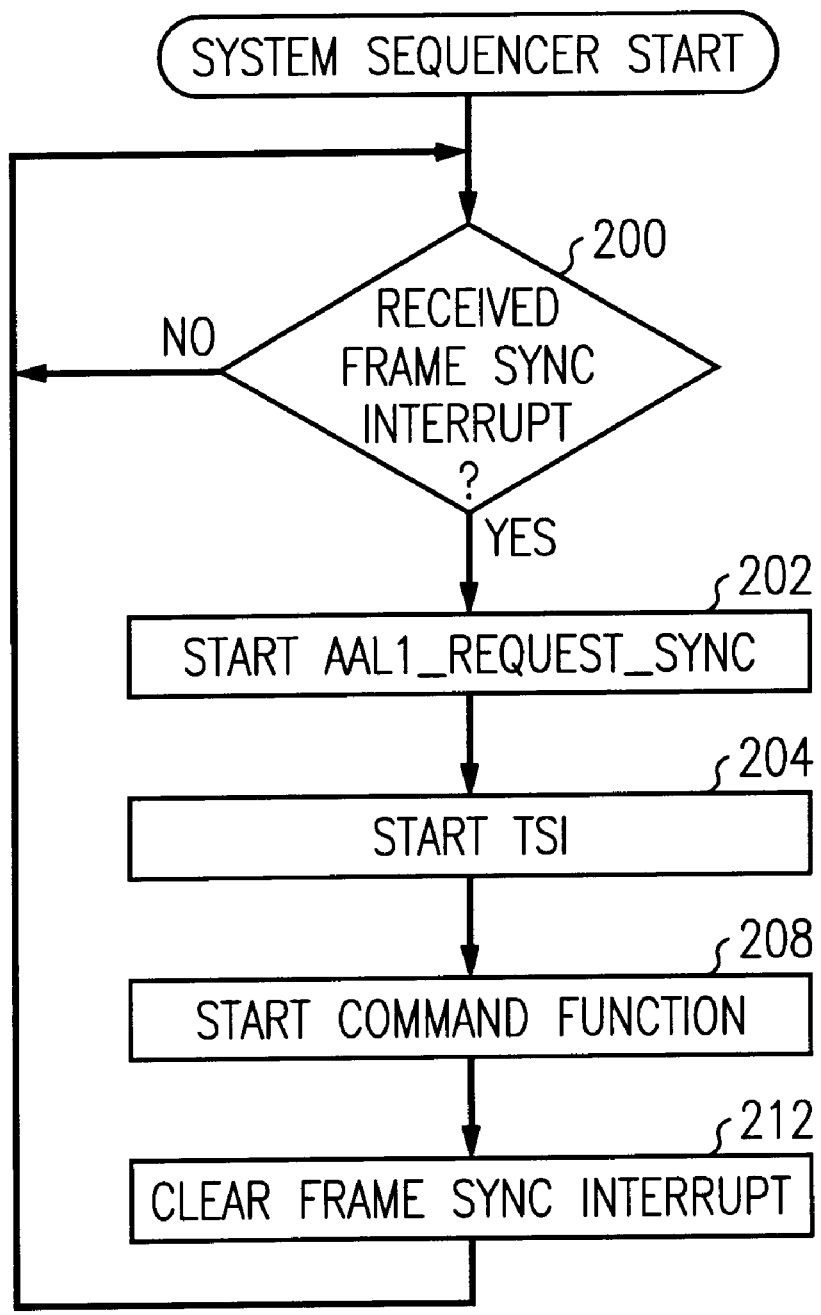
FIG. 2 is a functional flow diagram of operations of a system sequencer of the ATM cell constructor of FIG. 1.

High-level functionality of system sequencer 138 is shown in FIG. 2. System sequencer 138 awaits receipt of a frame sync interrupt from frame sync ISR 136, at step 200. Upon receipt of the interrupt, system sequencer 138 starts (e.g., invokes execution of) AAL1-request-sync (a global function of AAL1-request 112), at step 202, of TSI 108, at step 204. System sequencer 138 then starts command function 124, at step 208. Following step 208 or 210, system sequencer 138 clears the frame sync interrupt, at step 212, and returns to step 200 to await receipt of the next frame sync interrupt.

Figure 3:
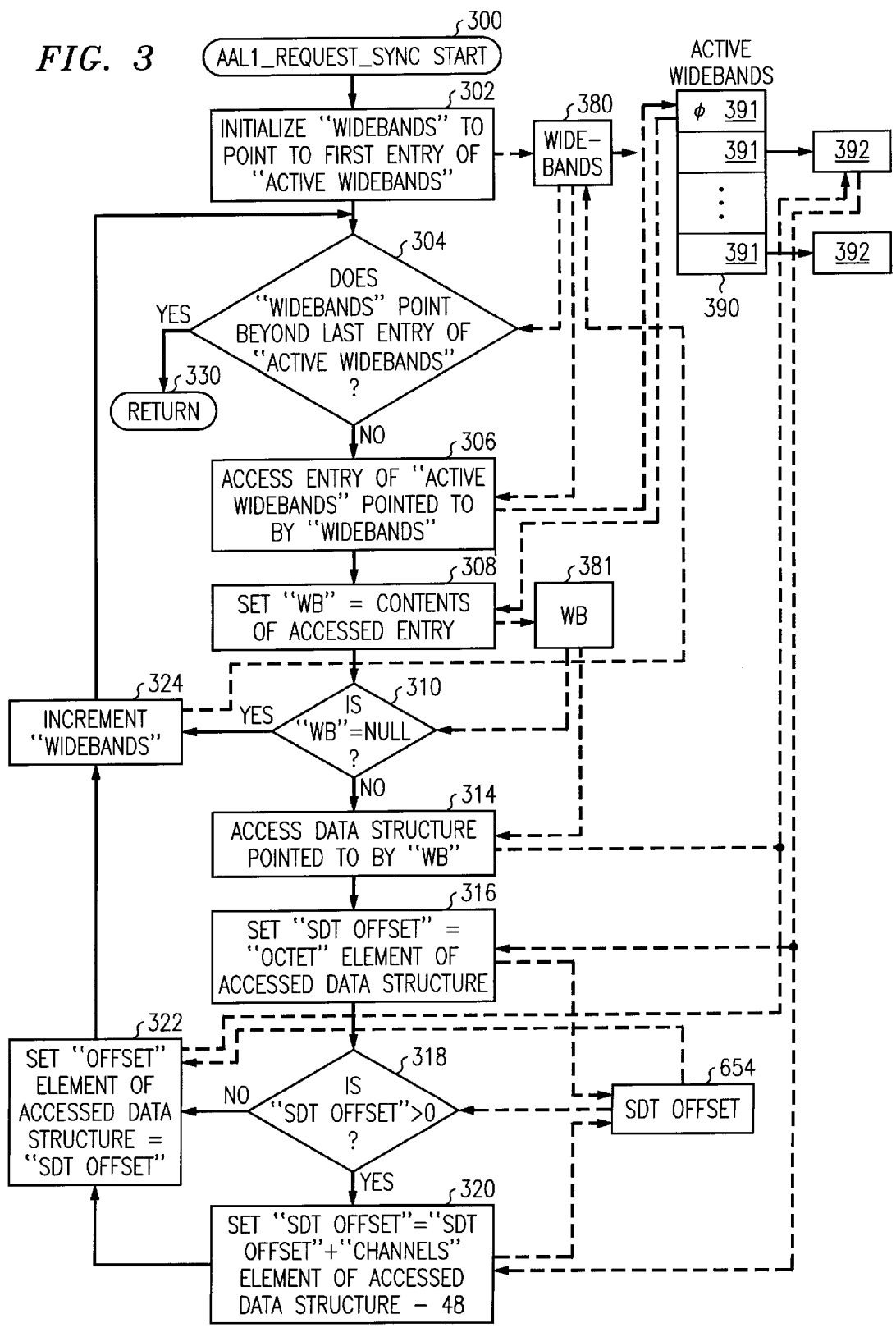
FIG. 3 is a functional flow diagram of operations of an AAL1-request-sync function of an AAL1-request component of the ATM cell constructor of FIG. 1.

The functionality of the AAL1-request-sync function of AAL1 request 112 is shown in FIG. 3. Upon its invocation, at step 300. The function clears an "SDT OFFSET" global variable 654, at step 303, and then returns to the point of its invocation, at step 304.

Figure 4:
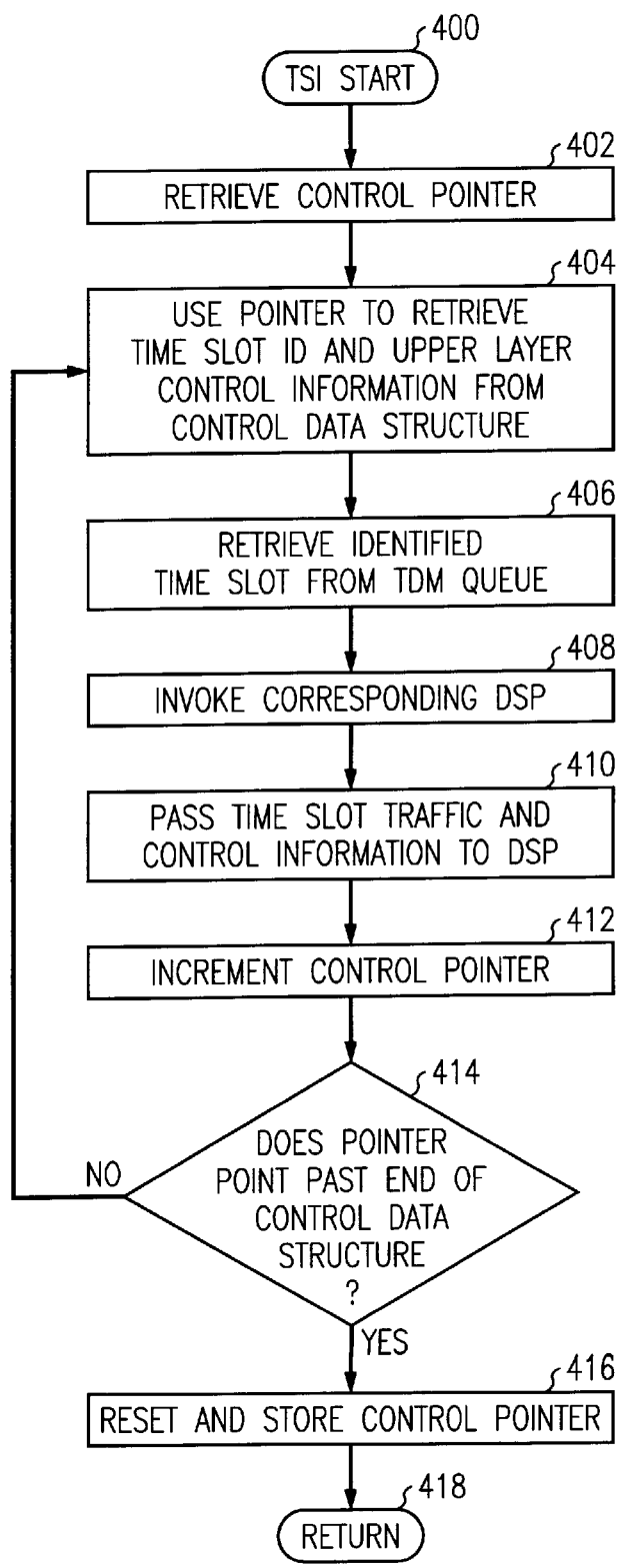
FIG. 4 is a functional flow diagram of operations of a time slot interchange (TSI) of the ATM cell constructor of FIG. 1.

The high-level functionality of TSI 108 is shown in FIG. 4. Upon its invocation, at step 400, TSI 108 retrieves a pointer to its own control data structure, at step 402, and then uses the pointer to retrieve a time slot identifier plus upper-layer control information for that time slot from the control data structure, at step 404. The upper-layer control information includes information on what processing DSP 110 must perform on this time slot, and an identifier of the instance of AAL1-request 112 that this time slot is associated with. TSI 108 then uses the time slot ID to retrieve the corresponding time slot of traffic from TDM queue 106, at step 406, if necessary invokes the time slot's corresponding instance of DSP 110, at step 408, and passes the traffic and the upper-layer control information to DSP 110, at step 410. TSI 108 then increments the pointer to its own control data structure, at step 412, and checks whether the pointer points past the last control data structure entry, at step 414. If not, it means that TSI 108 has not yet processed an entire TDM frame of time slots, and so TSI 108 returns to step 404. If the pointer does point past the end of the control data structure, it means that TSI 108 has finished processing a whole TDM frame, and so TSI 108 merely resets and stores the pointer, at step 416, and returns to the point of its invocation, at step 418.

Figure 5:
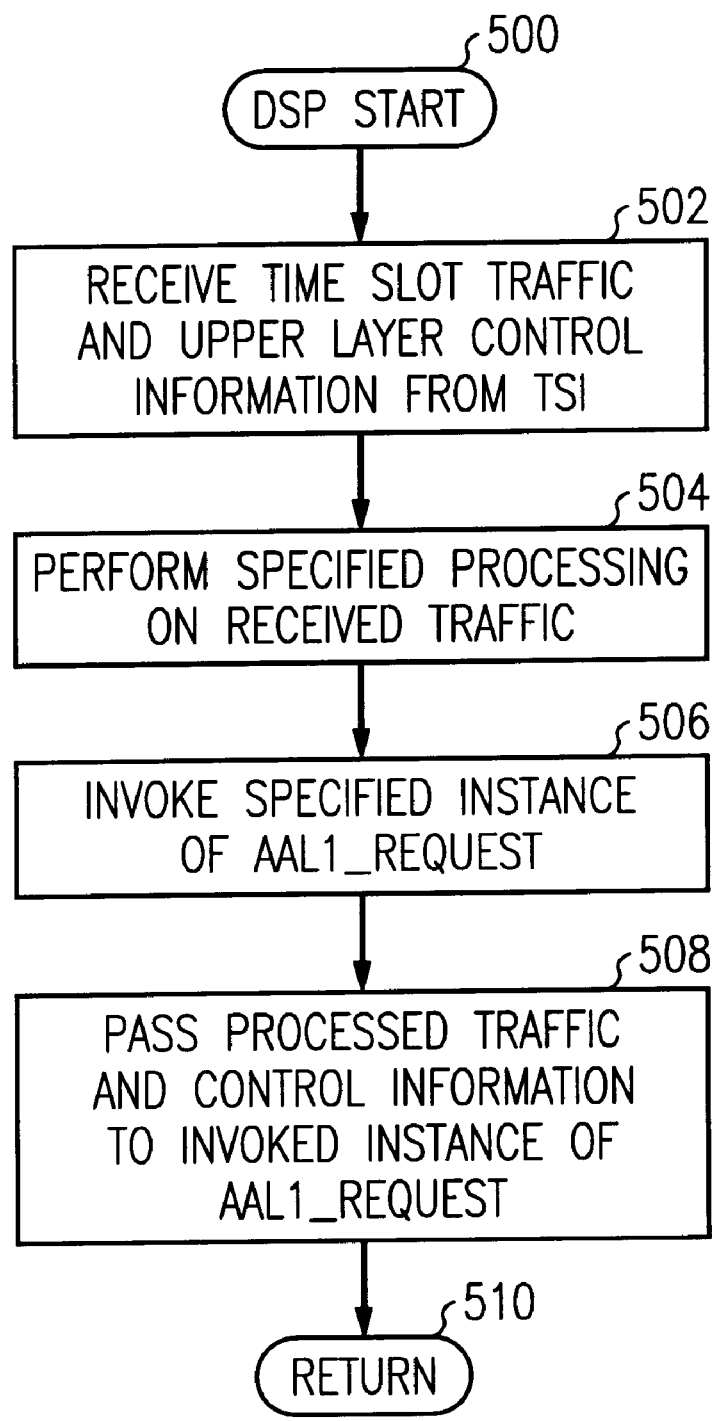
FIG. 5 is a functional flow diagram of operations of a digital signal processor (DSP) of the ATM cell constructor of FIG. 1.

The high-level functionality of each instance of DSP 110 is shown in FIG. 5. Upon its invocation, at step 500, the instance of DSP 110 receives a time slot of traffic and upper layer control information from TSI 108, at step 502. DSP 110 then performs the processing specified by the received control information on the received traffic, at step 504. DSP then invokes the instance of AAL1-request 112 that is specified by the received control information, at step 506, and passes it the control information and the processed traffic, at step 508. DSP 110 then returns to the point of its invocation, at step 510.

Figure 6:
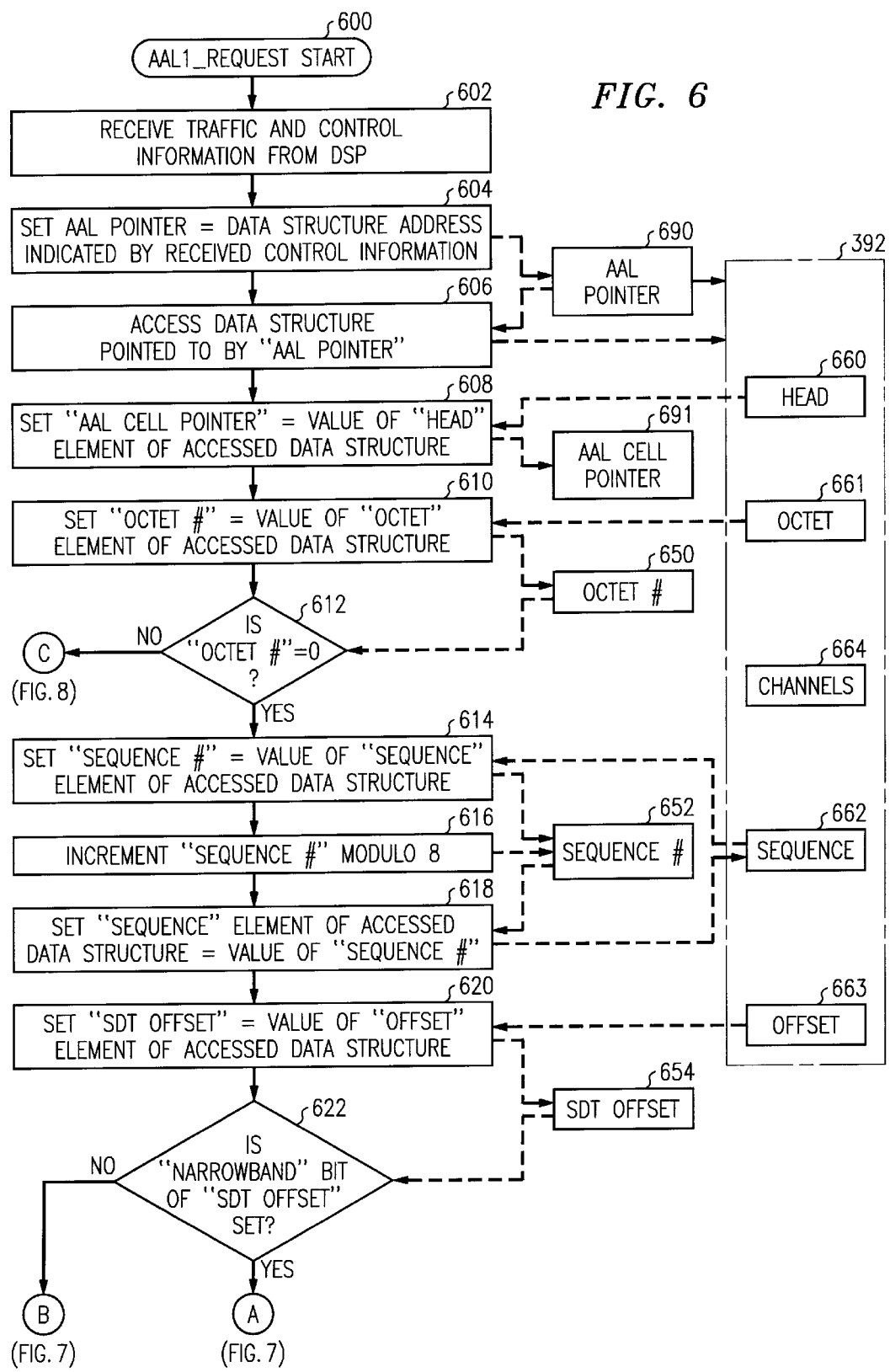
FIGS. 6–7 are a functional flow diagram of operations of the AA1-request component of the ATM cell constructor of FIG. 1.

The high-level functionality of each instance of AAL1-request 112 is shown in FIG. 6. Upon its invocation, at step 600, the invoked instance of AAL1-request 112 receives an octet of processed traffic and accompanying control information from DSP 110, at step 602. The invoked instance of AAL1-request 112 then assembles the received traffic into an ATM cell payload, at steps 604–636. If the invoked instance of AAL1-request 112 presently has a partly-formed cell payload, it adds the received traffic to that payload. If the invoked instance of AAL1-request 112 presently does not have a partly-formed cell payload, it starts assembling a new cell payload by creating an AAL1 layer header byte 1106 (as well as a P-format pointer 1108 every eighth cell) and attaching the received traffic thereto. AAL1-request 112 checks whether octet #650, an internal variable, is equal to zero, at step 604. If so, there is no partly-formed cell payload. AAL1-request 112 therefore increments a sequence #652, another internal variable, and ANDs it with 7 to perform a modulo-8 operation thereon, at step 606, and then checks if the value of sequence #652 is equal to 0, at step 608. If so, AAL1-request 112 proceeds to form AAL1 layer header 1106 and P-format pointer 1108 for a new ATM cell payload 1104. It sets C bit 1110 in octet #0 of payload 1104, at step 610; computes and stores CRC 1114 and P 1116 in octet #0, at step 612; sets SEQ 1112 equal to the value of sequence #652 in octet #0, at step 614; stores the value of SDT offset 654 in SDT offset 1120 of octet #1 of payload 1104, at step 616; computes and stores O 1118 in octet #1, at step 618; and sets the value of octet #650 to two, at step 620. SDT offset 654, it will be remembered, is a global variable, shared by all instances of AAL1-request 112 and reset at the occurrence of each frame sync signal on TDM bus 102 (see FIG. 3, step 303). Consequently, SDT offset 1120 is also synchronized with frame sync signals on TDM bus 102, and de markates the boundaries of TDM frames in the ATM traffic stream. Returning to step 608, if the value of sequence #652 is odd, AAL1-request 112 proceeds to form AAL1 layer header 1106 only. It computes and stores CRC 1114 and P 1116 in octet #0 of payload 1104, at step 622, sets SEQ 1112 equal to the value of sequence #652 in octet #0, at step 624, and sets the value of octet #650 to one, at step 626.

Figure 7:
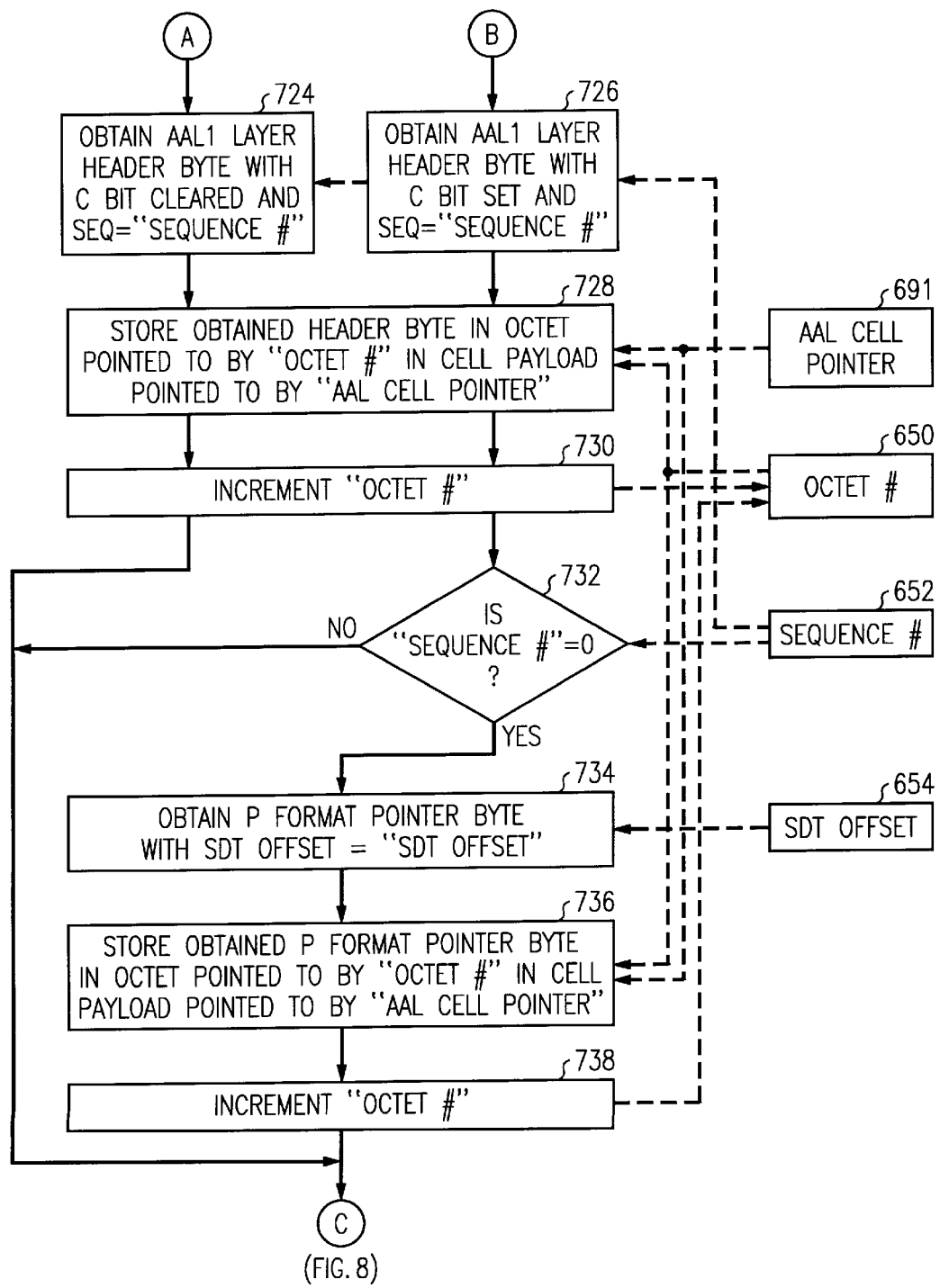

Having formed the initial one or two bytes of payload 1104 or having found at step 604 that there already is a partly-formed cell payload 1104, AAL1-request 112 stores the traffic that it had received at step 602 in the octet of payload 1104 pointed to by the value octet #650, at step 628. AAL1-request 112 then decrements the value of SDT offset 654, at step 630, and checks if its value is less than zero, at step 632 of FIG. 7. If so, AAL1-request 112 adds the value of a global variable channels 656 to SDT offset 654, at step 634. The value of channels 656 indicates the number of virtual channels that ATM cell constructor 100 is handling. Following step 634, or if it is determined at step 632 that the value of SDT offset 654 is not less than zero, AAL1-request 112 increments the value of octet #650, at step 636, and then checks if it is 48, at step 638. If not, assembly of a cell payload 1104 is not yet completed, and so AAL1-request 112 merely returns, at step 649; if so, assembly of a cell payload 1104 is completed, and so AAL1 request 112 sets the value of octet #650 to zero, at step 640, invokes a corresponding instance of ATM-request 114, at step 642, and passes to it the completed ATM cell payload, at step 644. AAL1-request 112 then returns, at step 649.

Figure 8:
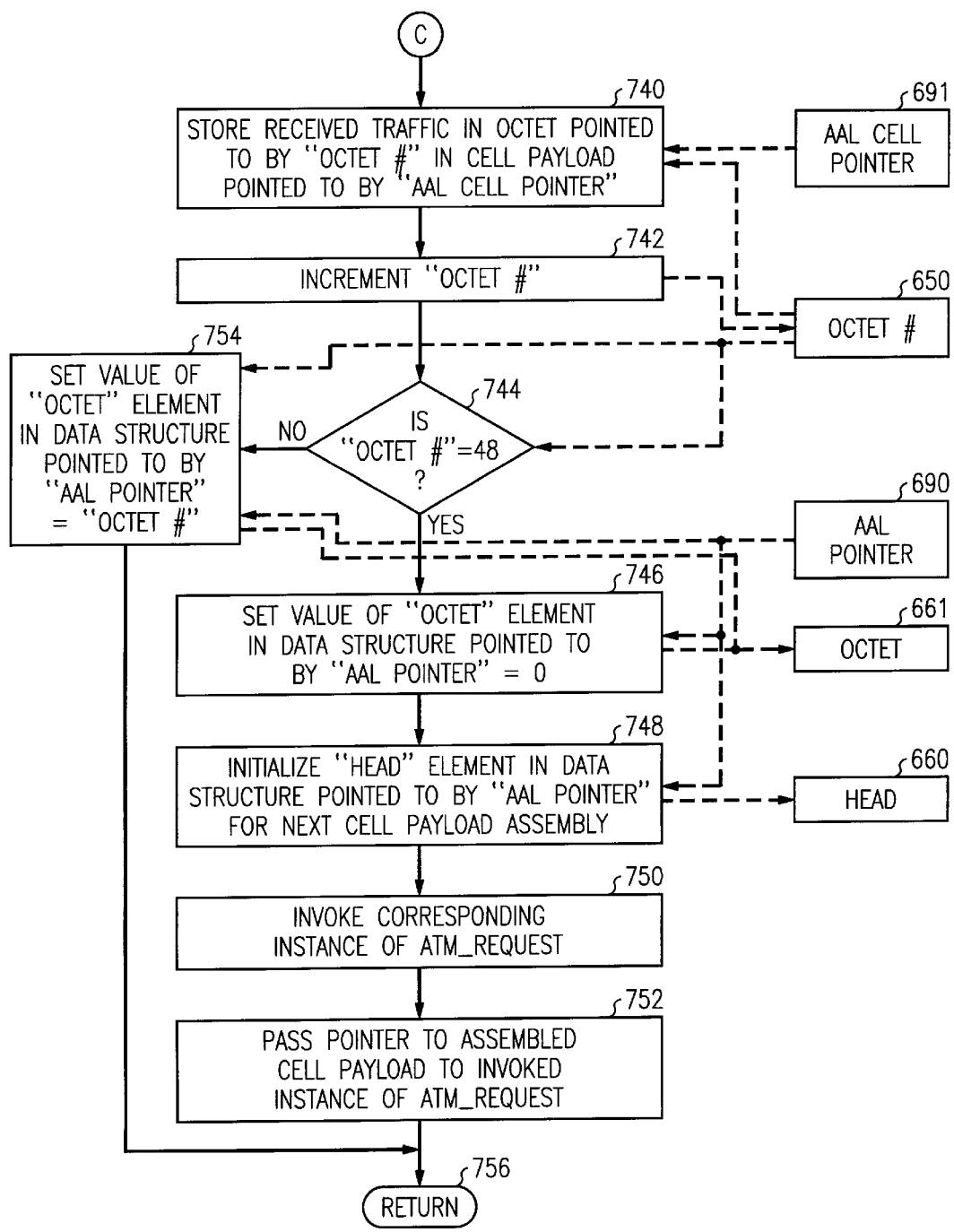
FIG. 8 is a functional flow diagram of operations of an AAL1-request-wideband-sync function of the AAL1-request component of the ATM cell constructor of FIG. 1.

The high-level functionality of the AAL1-request-wideband-sync function of AAL1-request 112 is shown in FIG. 8. Upon its invocation, at step 1000, the function sets a loop-counter variable equal to the total number of wide-band channels presently being processed by all instances of AAL1-request 112, at step 1002, and checks if the value of the loop counter is zero, at step 1003. If the loop-counter value is zero, it means that the function has analyzed all instances of AAL1-request 112 that are presently processing wideband channels, and so the function returns to the point of its invocation, at step 1018. If the loop-counter value is not zero, the function proceeds to step 1004 to analyze the next instance of AAL1-request 112 that is processing a wideband channel. At step 1004, the function retrieves a pointer to the first instance of AAL1-request 112 that is presently processing a wideband channel, and from that instance obtains an assembly pointer that points to the next ATM cell octet which the instance of AAL1-request 112 will assemble in the cell payload during the next frame interval, at step 1006. The function then increments the assembly pointer by the number of narrowband channels (time slots per frame) that constitute the wideband channel (it is assumed here that all wideband channels have the same known size), at step 1008, decrements the loop counter, at step 1014, and returns to step 1003 to determine if it has analyzed all instances of AAL1-request 112 that are presently processing wideband channels.

Figure 10:
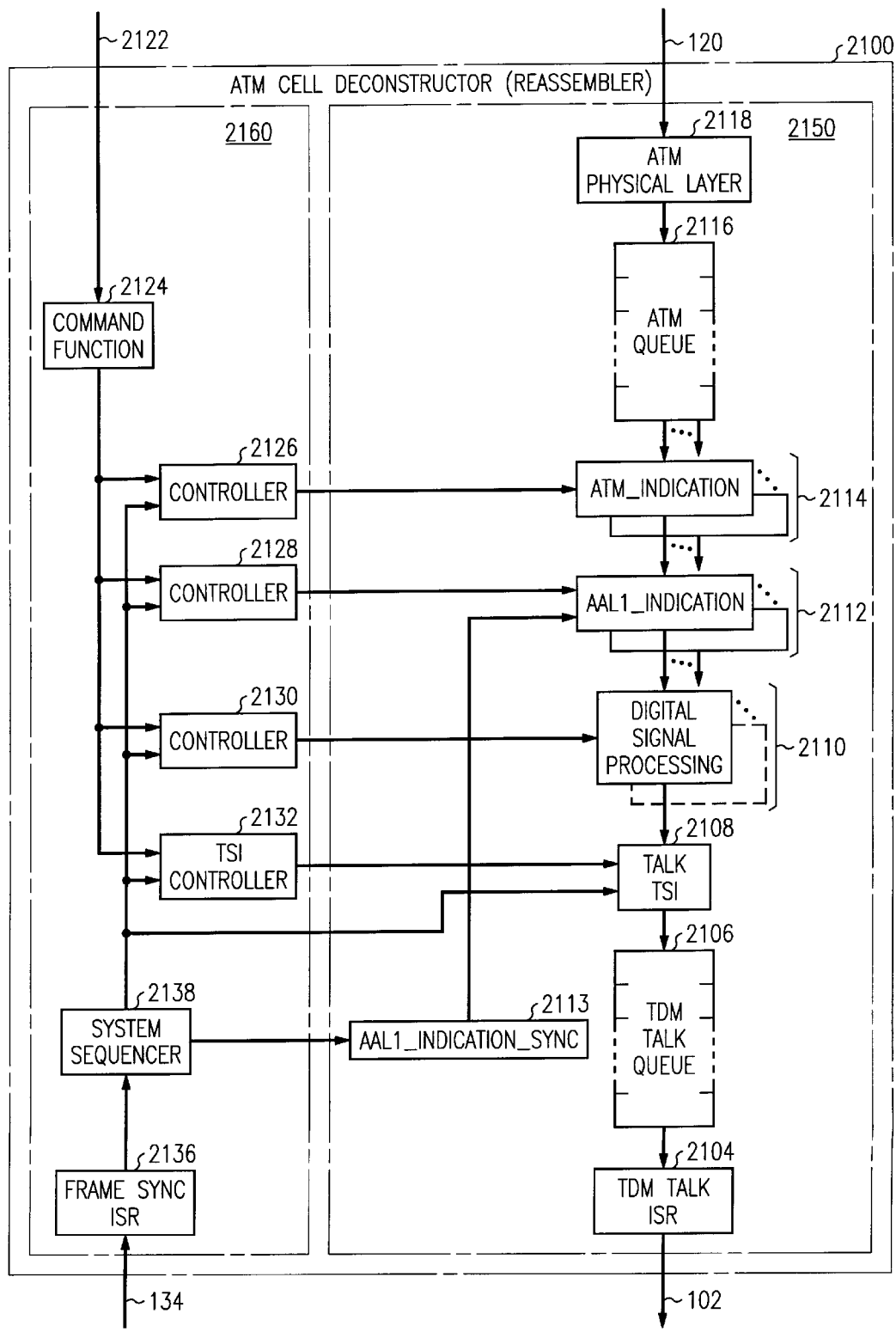
FIG. 10 is a block diagram of an ATM cell deconstructor that includes an illustrative embodiment of the invention.

FIG. 10 shows an ATM cell deconstructor 2100, also known as an ATM cell reassembler, such as may be and in an interface port circuit of a PBX or in any other ATM interface apparatus to deconstruct ATM cells into CBR traffic streams. Like constructor 100, deconstructor 2100 may be implemented either in hardware or in software/firmware. Deconstructor 2100 and its parts are functionally mirror images of constructor 100 and its parts. ATM cells are sequentially received on ATM communications medium 120 by an ATM physical layer 2118 and follow a data path 2150 through ATM cell deconstructor 2100 where the cells are broken down into successive segments of CBR traffic streams, and the traffic streams are transmitted on communications medium 102. ATM physical layer 2118 feeds received ATM cells into an ATM queue 2116, which supplies them to ATM-indication processor 2114. There is one instance of ATM-indication processor 2114 per channel. An instance of ATM-indication processor 2114 detaches the ATM cell header from ATM cells carrying its channel's traffic, and sends the ATM cell payload to a corresponding instance of AAL1-indication processor 2112, each one of which instances is dedicated to serving a different channel. Each instance of AAL1-indication processor 2112 extracts the corresponding channel's octets of traffic from the received payloads and outputs the octets to one or more DSPs 2110 for processing. A single DSP 2110 may be time-shared by the plurality of channels, or a separate DSP 2110 may be dedicated to serving each channel. DSPs 2110 perform designated processing for the traffic of each channel, and output the processed traffic into a talk TSI 2108. Talk TSI 2108 performs any necessary time-slot interchange function thereon to align the traffic octets of different channels with the sequence of their corresponding time slots on medium 102. Talk TSI 2108 also provides support for wideband channels that comprise multiple time slots; it ensures that those time slots are output in their proper order. Talk TSI 2108 then feeds the ordered time slots of traffic into a TDM talk queue 2106, from where they are transmitted onto designated time slots of frames on medium 102 by TDM talk ISR 2104.

A control structure 2160 controls the operation of the components of data path 2150. Cell deconstructor 2100 receives control information over a control medium 2122, which illustratively duplicates control medium 122 of cell constructor 100. The control information is received in cell deconstructor 2100 by a command function 2124. This is a management function which tells controllers 2126–2132 of individual components of data path 2150 what their component should be doing and when. For example, it tells TSI controller 2132 when talk TSI 2108 should begin to support a new time slot and which instance of AAL1-indication 2112 that time slot should be associated with, it tells controller 2126 what VCINPI an instance of ATM-indication 2114 should use for a particular channel, it tells controller 2128 when to initialize an instance of AAL1-indication 2112 for a new channel, and it tells DSP 2110 what processing to perform for which channel. Controllers 2126–2132 then alert the corresponding necessary control over their associated components in data path 2150.

Figure 11:
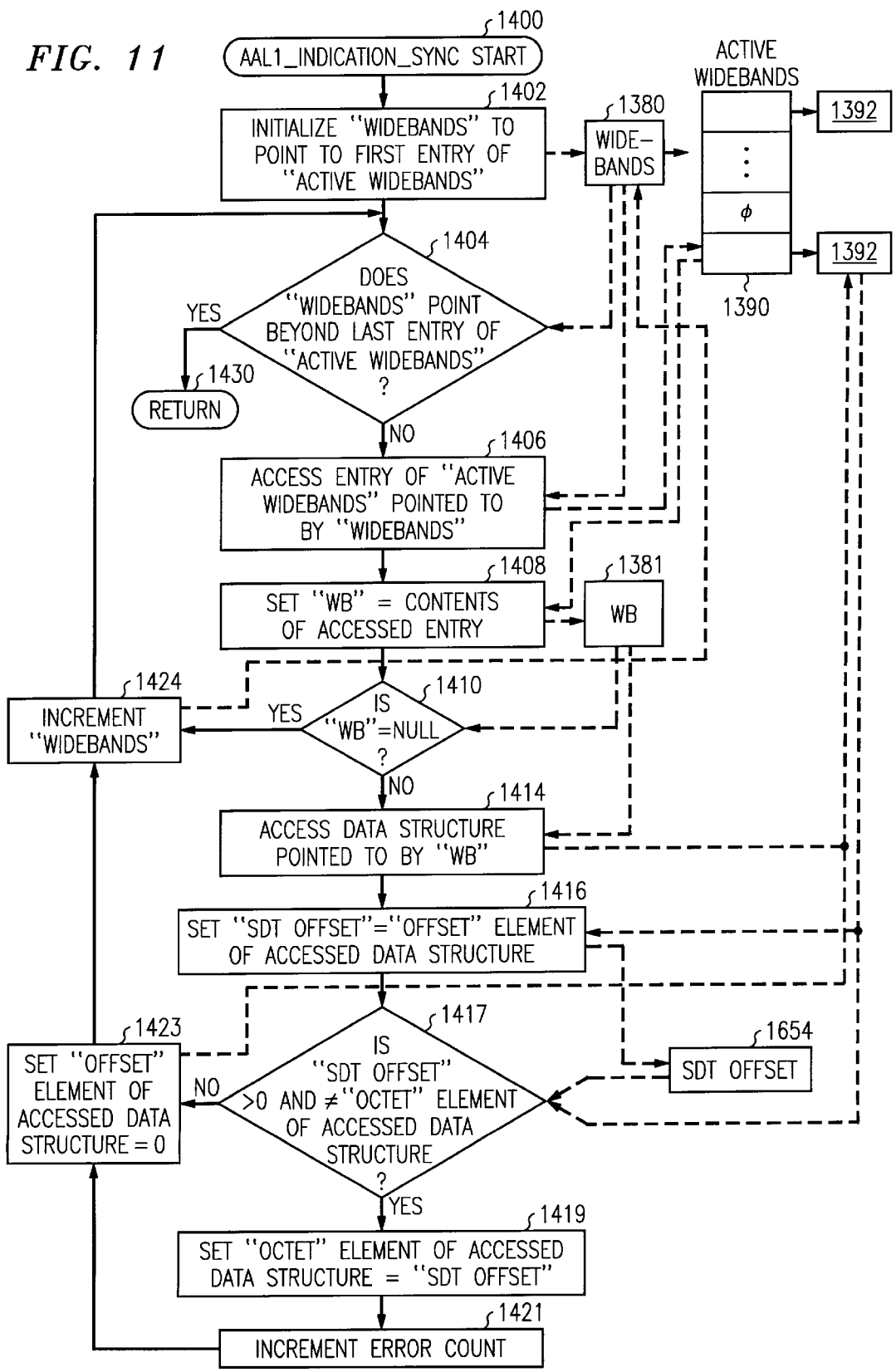
FIG. 11. is a functional flow diagram of operations of an AAL1-indication-sync function of an AA1-indication component of the ATM cell deconstructor of FIG. 10.

To keep cell deconstructor 2100 properly synchronized with the operation of communications medium 102 in the instance where medium 102 is a TDM bus, a start-of-frame signal is supplied to cell deconstructor 2100 in a signal line 134. Line 134 is monitored by a frame sync ISR routine 2136, which issues an interrupt each time that it detects the start-of frame signal. The interrupt is received by a system sequencer 2138, which is a state machine that causes the components of data path 2150 to step through their functions during each frame period. Upon receipt of the interrupt, system sequencer 2138 also starts (e.g., invokes execution of) AAL1-indication-sync function (a global function of AAL1-indication 2112). The functionality of the AAL1-indication-sync function is shown in FIG. 11. Upon its invocation, at step 1400, the function clears an "STD offset" 1654, a global variable of ATM cell deconstructor 2100, at step 1404, and then returns to the point of its invocation, at step 1406.

Figure 12:
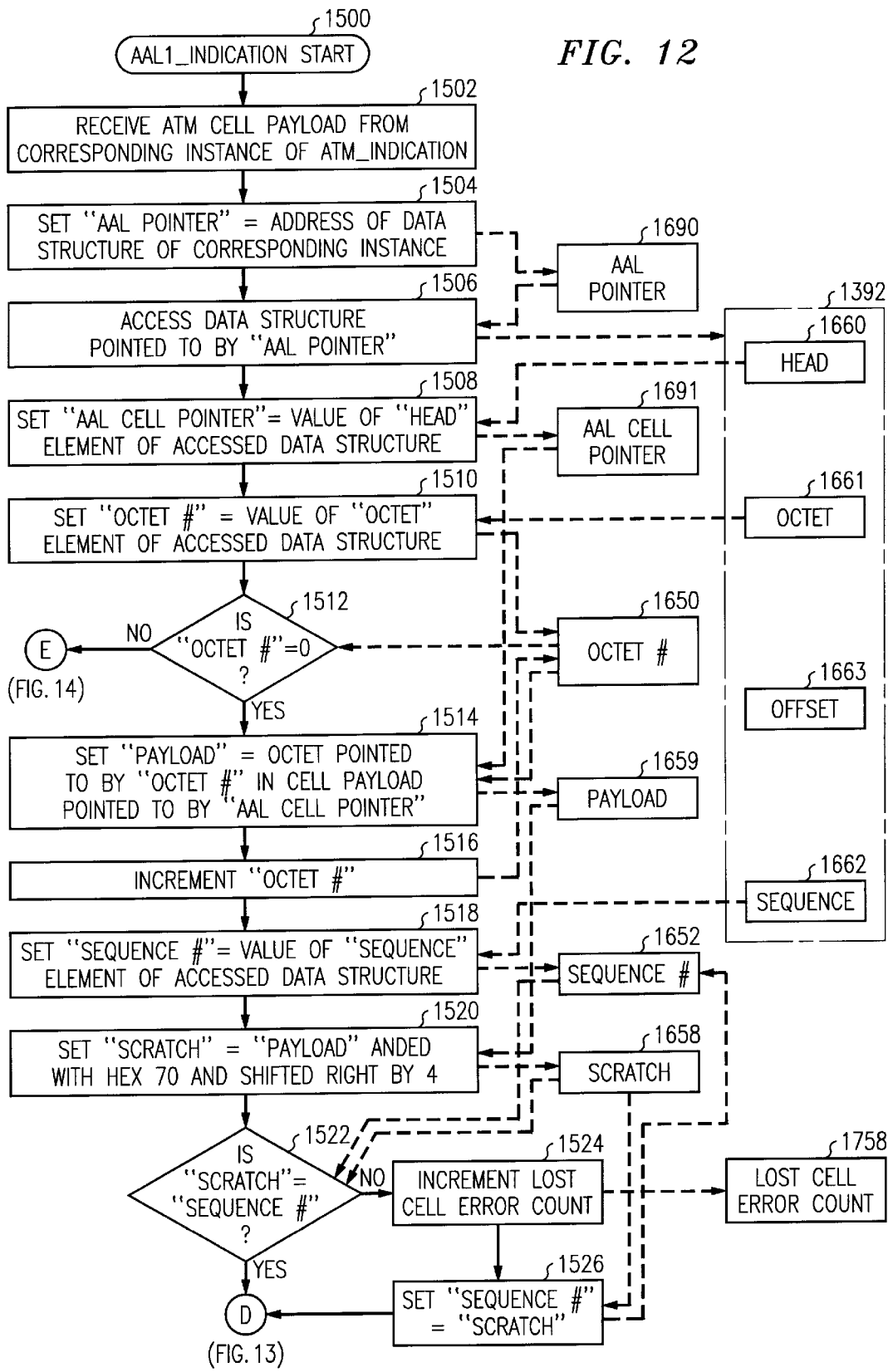
FIGS. 12–13 are a functional flow diagram of operations of the AAL1-indication component of the ATM cell deconstructor of FIG. 10.
Figure 13:
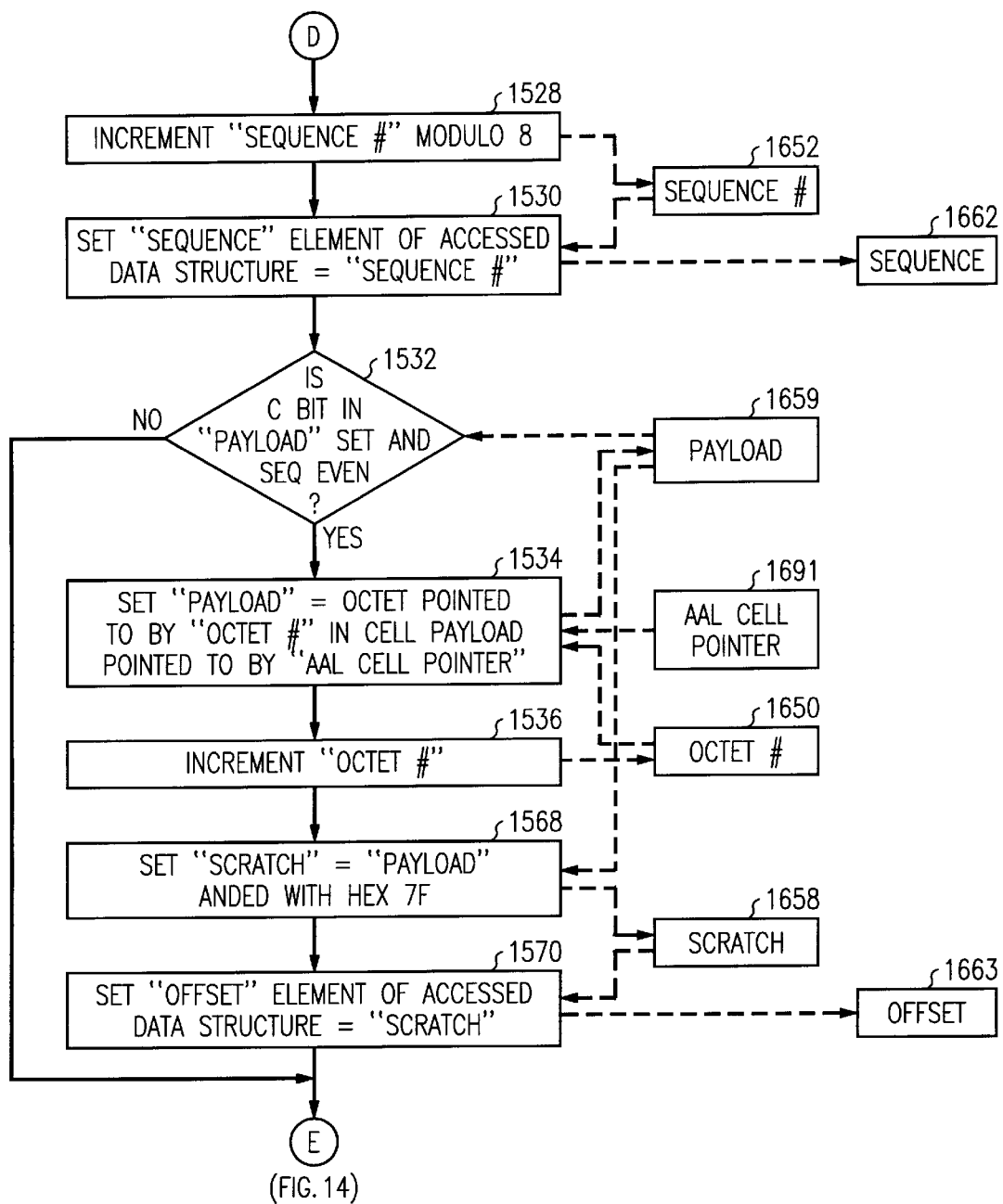

The high-level functionality of each instance of AAL1-indication 2112 is shown in FIGS. 12–13–16. Upon its invocation, at step 1500, the invoked instance of AAL1 indication 2112 proceeds to disassemble an octet from an ATM cell payload 1104. AAL1 indication 2112 first checks whether the value of octet #1650, a global variable of ATM cell deconstructor 2100, is zero, at step 1502. If not, AAL1-indication 2112 is in the midst of disassembling an ATM cell payload 1104, and so it proceeds to FIG. 13 to disassemble another octet from the payload. If the value of octet #1650 is zero, AAL1-indication 2112 has completed disassembling of an ATM cell payload 1104 and is ready to start disassembly of a next ATM cell payload 1104. It therefore proceeds to receive an ATM cell payload 1104 from a corresponding instance of ATM-indication 2114, at step 1504. AAL1-indication 2112 then retrieves SEQ 1112 from octet #0 of that payload, at step 1506, and checks if its value equals the value of sequence #1652, at step 1508. If the two values are not equal, it means that an ATM cell has been lost in transmission, and so AAL1-indication 2112 increments a lost cell error counter 1658 to give an indication of the loss, at step 1510. Following step 1510, or if the value of SEQ 1112 is found to equal the value of sequence #1652 at step 1508, AAL1-indication 2112 increments sequence #1652 and ANDs the incremented value with 7 to effect a modulo-8 operation thereon, at step 1512. AAL1-indication 2112 then checks if C bit 1110 of octet #0 of the ATM cell payload 1104 that is being disassembled is set and SEQ 1112 is even, at step 1514. If so, set it means that octet #1 of that payload is a P-format pointer 1108. AAL1-indication 2112 therefore retrieves SDT offset 1120 from octet #1, at step 1516, sets the value of SDT offset 1654 to the retrieved value of SDT offset 1120 to ensure that the value of SDT offset 1654 is in sync with the value of SDT offset 1120, at step 1518, and then sets the value of octet #1650 to two, at step 1520. Returning to step 1514, if the condition is not met, the second octet of that payload is an ordinary payload octet. AAL1-indication 2112 therefore sets the value of octet #1650 to one, at step 1522.

Following step 1520 or 1522, or if it was determined at step 1502 that the value of octet #1650 is not zero, AAL1-indication 2112 proceeds to retrieve from the ATM payload 1104 being disassembled the octet pointed to by the value of octet #1650, at step 1530 of FIG. 13. AAL1-indication 2112 then decrements SDT offset 1654, at step 1532, and checks if the decremented value is less than zero, at step 1534. If so, it means that a block of information (a frame of channels) has been disassembled and disassembly of a new block is beginning, or that a new frame is beginning on TDM bus 102. AAL1-indication 2112 therefore adds the value of channels 656 to SDT offset 1654 to reinitialize SDT offset 1654, at step 1536, and also sets a "first channel" flag that will accompany the just-retrieved octet to subsequent elements 2104–2110 of data path 2150, at step 1538. Following step 1538, or if it was determined at step 1534 that the value of SDT offset 1654 is not less than zero, AAL1-indication 2112 increments octet #1650, at step 1540, and checks if the incremented value exceeds 48, at step 1542. If so, it means that disassembly of this ATM cell payload 1104 has been completed, so AAL1 -indication 2112 resets the value of octet #1650 to zero, at step 1544. Following step 1544, or if it was determined at step 1542 that the value of octet #1650 does not exceed 48, AAL1-indication 2112 returns to the point of its invocation, at step 1546.

Figure 14:
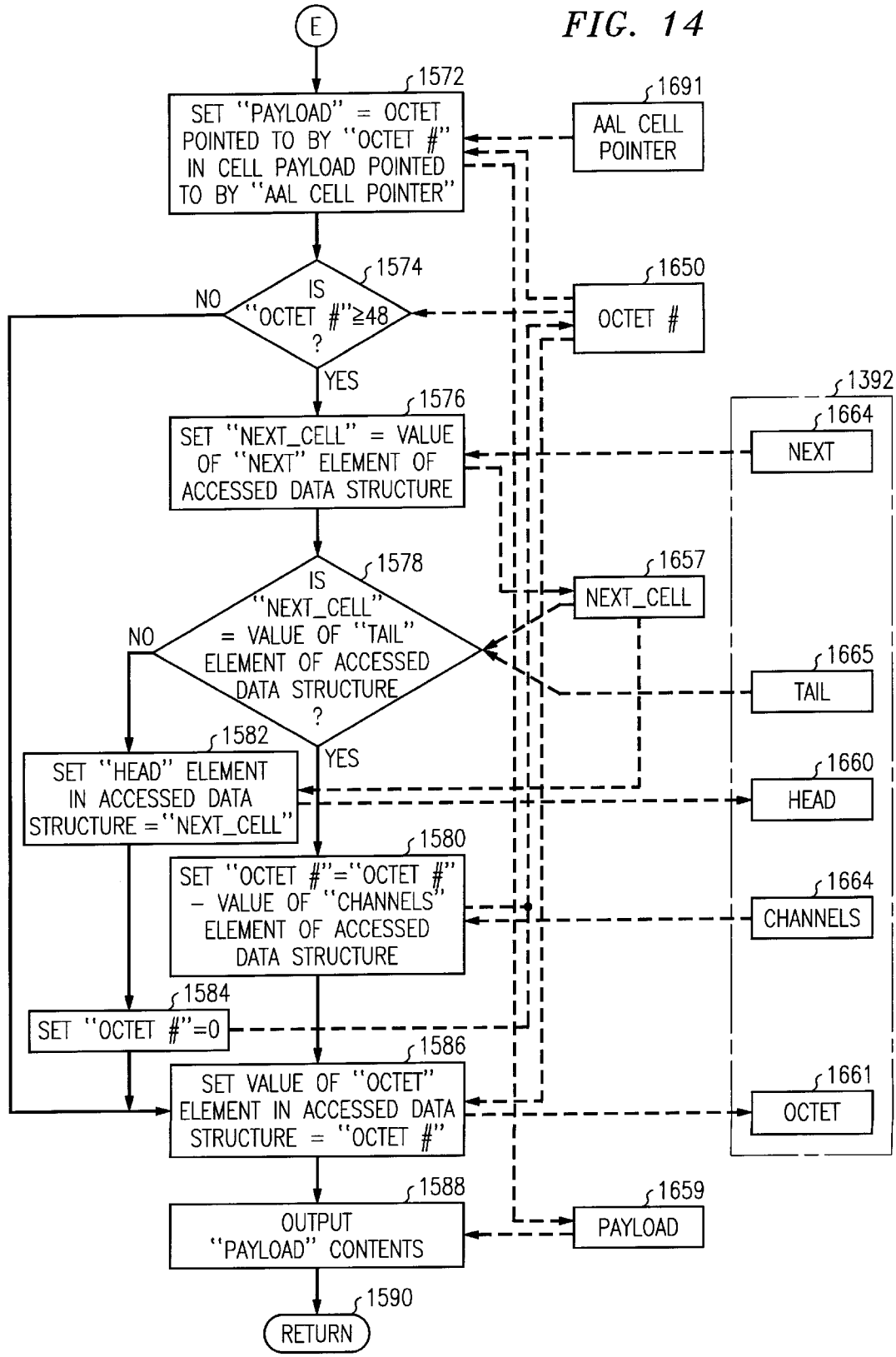
FIG. 14 is a functional flow diagram of operations of a talk time slot interchange (TSI) component of the ATM cell deconstructor of FIG. 10.

The high-level functionality of talk TSI 2108 is shown in FIG. 14. Upon its invocation, at step 1700, TSI 2108 initializes a TSI pointer 1750. TSI pointer 1750 points into a TSI control memory to a location that specifies the received time slot which the TSI should presently be outputting. TSI 2108 also initializes a loop counter 1752 to the value of channels 656, at step 1704. Loop counter 1752 is thus initialized to the number of channels of traffic carried by received frames. TSI 2108 then checks is the value of loop counter 1752 is greater than zero, at step 1706. If not, TSI 2108 has complete time-slot interchanging of a frame, and so it returns to the point of its invocation, at step 1722. But if the value of loop counter 1752 is greater than zero, TSI 2108 continues its function by retrieving, from a buffer of DSPs 2110, the time slot (octet of traffic) pointed to by TSI pointer 1750, at step 1708. TSI 2108 checks if the retrieved time slot is accompanied by a "first channel" flag, at step 1710. If so, TSI 2108 resets itself to a start-of-frame-processing by reinitializing TSI pointer 1750 to zero, at step 1712, and by reinitializing loop counter 1752 to the value of channels 656, at step 1714. TSI 2108 thus ensures that its operation is synchronized with the occurrence of frame boundaries in both the stream of incoming traffic and the TDM bus 102.

After step 1714, or if it is determined at step 1710 that the retrieved time slot is not accompanied by a "first channel" flag, TSI 2108 outputs the retrieved time slot to TDM talk queue 2106, at step 1716. TSI 2108 then decrements the value of loop counter 1752, at step 1718, increments the value of TSI pointer 1750, at step 1720, and returns to step 1706 to determine if it is done processing a full frame of traffic.

Figure 15:
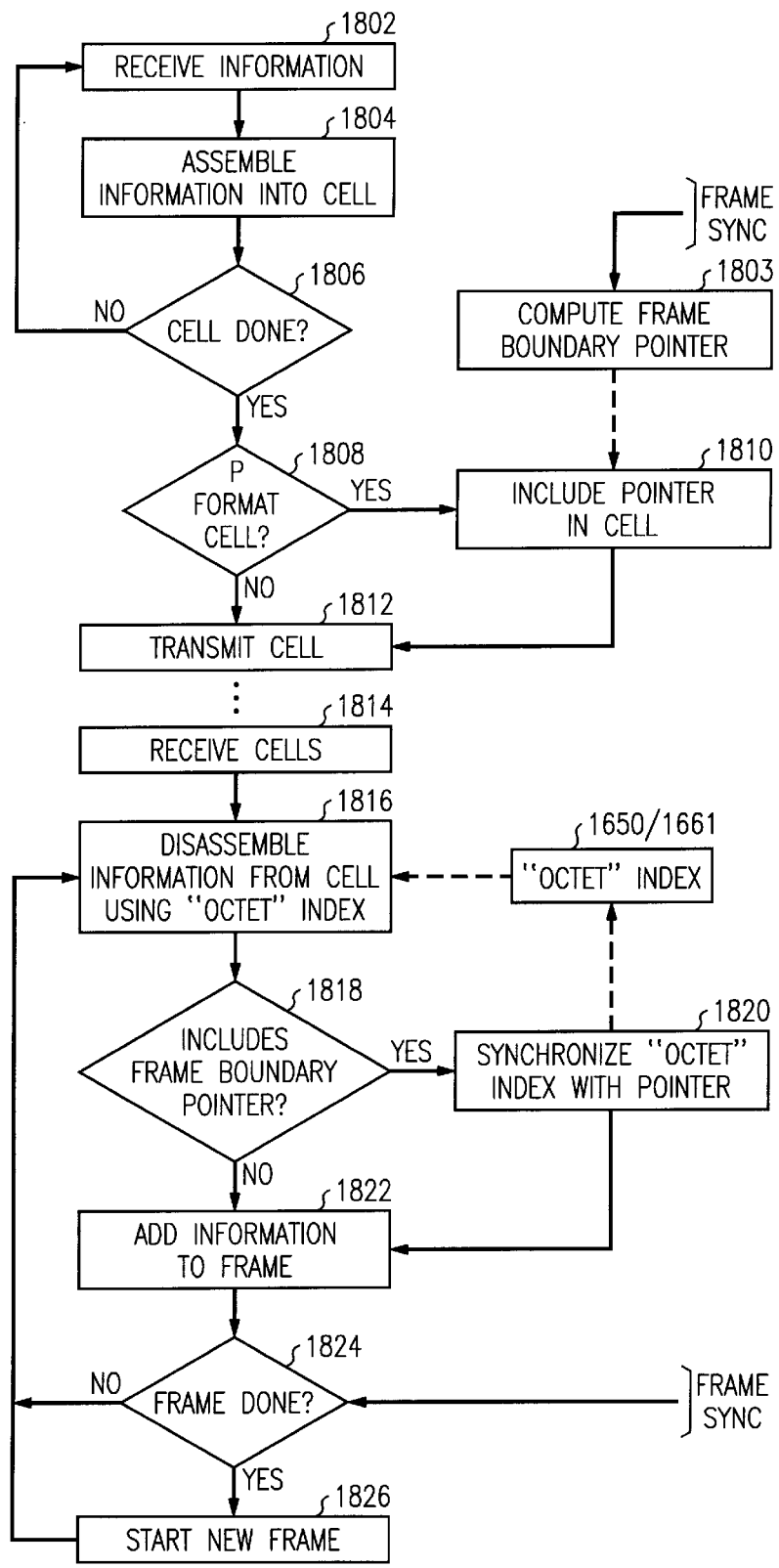
FIG. 15 is a flow-diagram summary of the functionality of the ATM cell constructor and deconstructor of FIGS. 1 and 10 that is relevant to the invention.

The high-level operations of ATM cell constructor 100 and deconstructor 2100 that are relevant hereto are summarized in FIG. 15. Constructor 100 receives a piece of information (traffic) from TDM bus 102, at step 1802, and assembles it into an ATM cell, at step 1804. If the piece of information is accompanied by a frame signal on listen bus 102, as determined at step 1806, constructor 100 includes a SDT offset pointer 1120 to that piece of information in the ATM cell that is being assembled, at step 1810. After step 1806 or 1810, constructor 100 checks if it is done assembling a cell; if not, it returns to step 1802, and if so, it transmits the ATM cell on ATM link 120, at step 1812.

The transmitted ATM cells are received by deconstructor 2100, at step 1814, which disassembles the information (traffic) therefrom piece-by-piece, at step 1816. Deconstructor 2100 checks whether the disassembled information is pointed to by SDT offset pointer 1120, at step 1818, or accompanied by a frame signal on talk bus 102, at step 1819. If so, talk TSI 2108 resets, at step 1820, and starts processing a new TDM frame, at step 1821. Following step 1819 or 1821, talk TSI 2108 effectively adds the piece of information to the frame on talk bus 102, that it is processing by outputting it to TDM talk queue 2106 for transmission on talk TDM bus 102. TSI 2108 then checks whether it has completed outputting a TDM frame, at step 1824. If not, operation returns to step 1816; if so, TSI 2108 starts processing a new TDM frame, at step 1826, and operation returns to step 1816.

Of course, various changes and modifications to the illustrative embodiment described above may be envisioned. For example the invention is applicable not only to ATM systems, but also to frame-relay, voice-over-IP (internet protocol), and other systems that support synchronous constant-bit rate (e.g., voice, video, data) connections. Such changes and modifications can be made without departing from the spirit and the scope of the invention and without diminishing its attendant advantages. It is therefore intended that such changes and modifications be covered by the following claims.

What is claimed is:

1. A method of synchronizing synchronous information received by a receiver over an asynchronous communications link with a synchronous communications medium at the receiver, comprising:

asynchronously receiving at the receiver a stream of information including a sequence of items of the synchronous information and an indication of where in the stream of information occurred a boundary between blocks of the synchronous information;

assembling the items of the received synchronous information sequentially, along with other information, into transmission blocks;

transmitting the transmission blocks on the medium;

in response to receiving the indication, moving the assembling of the items from a last-assembled one of the items to an item of the received synchronous information that is not sequential with the last-assembled item so that the boundary between the blocks of the synchronous information forms a boundary between the synchronous information carried by two successive said transmission blocks; and subsequent to the moving, assembling the items sequentially from the non-sequential item, along with the other information, into the transmission blocks.

2. The method of claim 1 wherein:

the indication indicates where in the synchronous information occurred the boundary between blocks of the synchronous information.

3. The method of claim 1 wherein: each said boundary between blocks of the synchronous information and each said boundary between the transmission blocks comprises a boundary between adjacent time-division-multiplex (TDM) frames of information. (ATM) cells.

4. The method of claim 3 wherein:

the stream of information comprises a wideband channel carrying the sequence of the items of the synchronous information and comprising a plurality of time slots of each TDM frame.

5. The method of claim 4 wherein:

assembling comprises during each frame interval, sequentially disassembling a block's worth of the items of the synchronous information from the stream of information, and during each frame interval, sequentially assembling a disassembled block's worth of the items of the synchronous information into a TDM frame;

adjusting comprises in response to receiving the indication, moving the disassembling of the items from a last-disassembled one of the items to an individual item of the synchronous information that is not sequential with the last-disassembled item so that during each frame interval disassembling begins and ends at a block boundary; and assembling subsequent to the moving comprises subsequent to the moving, disassembling the items sequentially from the individual item.

6. The method of claim 1 wherein:

the medium is a time-division-multiplexed (TDM) medium;

the indication is an indication of occurrence of a TDM framing signal; and detecting comprises detecting TDM frame signals on the medium.

7. The method of claim 1 wherein:

asynchronously receiving comprises receiving the stream of information in packets.

8. The method of claim 7 wherein:

the packets comprise asynchronous transfer mode (ATM) cells.

9. The method of claim 8 wherein:

the medium is a time-division-multiplexed (TDM) medium; and the SDT pointer points to a boundary between items of information carried by different TDM frames.

10. A method of synchronizing synchronous information received by a receiver over an asynchronous communications link with a synchronous communications medium at the receiver, comprising:

asynchronously receiving at the receiver a plurality of streams of information each including a corresponding sequence of items of synchronous information and an indication of where in the stream occurred a boundary between blocks of the synchronous information carried by said stream;

assembling the items of the received synchronous information sequentially from each of the plurality of streams into transmission blocks;

transmitting the transmission blocks on the medium;

in response to receiving the indication in any one of the streams, moving the assembling of the items of the one stream from a last-assembled one of the items to an item of the corresponding sequence of items of synchronous information that is not sequential with the last-assembled item of the one stream so that the boundary between the blocks of the synchronous information of the one stream forms a boundary between the synchronous information of the one stream carried by two successive said transmission blocks; and subsequent to the moving, assembling the items of the synchronous information of the one stream sequentially from the non-sequential item of the one stream.

11. The method of claim 10 wherein:

assembling the items of the received synchronous information sequentially from each of the plurality of streams into the transmission blocks comprises assembling the items of the received synchronous information sequentially from each of the plurality of streams into each transmission block.

12. The method of claim 11 wherein:

detecting at the transmitter comprises repeatedly detecting occurrence of boundaries between sequential blocks of the information;

transmitting from the transmitter comprises in response to each individual detected boundary, transmitting the first indication of where in the information the individual boundary occurred;

receiving at the receiver comprises repeatedly receiving the first indication at the receiver; and synchronizing comprises in response to receipt of each individual first indication, synchronizing the transmission from the receiver on the first medium of the information at the individual boundary indicted by the individual first indication with occurrence of a boundary between blocks on the first medium.

13. The method of claim 11 wherein:

each said boundary between blocks of the synchronous information and each said boundary between the transmission blocks comprises a boundary between adjacent time-division-multiplex (TDM) frames of information.

14. The method of claim 13 wherein:

each first indication points to information carried by a first time slot of a TDM frame;

transmitting from the receiver comprises time-slot interchanging the information to form TDM frames of information, and transmitting the TDM frames of information from the receiver on the first medium; and synchronizing comprises in response to receipt of the first indication, resetting the time-slot interchanging to form a TDM frame starting with the information pointed to by the first indication, and transmitting each formed TDM frame in a TDM frame of the first medium.

15. The method of claim 14 wherein:

assembling comprises during each frame interval, sequentially disassembling a block's worth of the items of the synchronous information from each stream, and during each frame interval, sequentially assembling the disassembled block's worth of the items of the synchronous information from each stream into a TDM frame;

adjusting comprises in response to receiving the indication in any one of the streams, moving the disassembling of the items of the one stream from a last-disassembled one of the items of the one stream to an individual item of the synchronous information of the one stream that is not sequential with the last-disassembled item so that during each frame interval disassembling of the one stream begins and ends at a block boundary; and assembling subsequent to the moving comprises subsequent to the moving, disassembling the items of the one stream sequentially from the individual item.

16. The method of claim 11 wherein:

transmitting the information asynchronously comprises transmitting the information in packets.

17. The method of claim 16 wherein:

the packets comprise asynchronous transfer mode (ATM) cells.

18. The method of claim 17 wherein:

the first indication comprises a structured data transfer (SDT) offset pointer of an AAL payload of an ATM cell.

19. The method of claim 12 wherein:

asynchronously receiving comprises receiving each stream as asynchronous transfer mode (ATM) cells including the corresponding synchronous information as AAL payload and the indication as a structured data transfer (SDT) offset pointer of the AAL payload pointing to a first block boundary between blocks in the AAL payload;

assembling comprises during each frame interval, sequentially disassembling a block's worth of octets of the synchronous information from an ATM cell of each stream, and during each frame interval, sequentially assembling the disassembled block's worth of the octets of the synchronous information from every stream into a TDM frame; and adjusting comprises in response to commencing to disassemble a whole block's worth of information from an AAL payload that includes the SDT offset pointer, advancing the disassembling to commence the sequential disassembling of the octets of the whole block at the block boundary pointed to by the SDT offset pointer.

20. A communications apparatus for performing the method of claims 1 or 2 or 3 or 4 or 5 or 6 or 7 or 8 or 9 or 10 or 11 or 12 or 13 or 14 or 15 or 16 or 17 or 18 or 19.

21. A computer-readable medium containing software which, when executed in a computer, causes the computer to perform the method of claims 1 or 2 or 3 or 4 or 5 or 6 or 7 or 8 or 9 or 10.

* * * * *